United States Patent
Choi

(10) Patent No.: US 12,026,398 B2
(45) Date of Patent: Jul. 2, 2024

(54) MEMORY SYSTEM PERFORMING FLUSH OPERATION FOR BUFFER REGION

(71) Applicant: SK hynix Inc., Gyeonggi-do (KR)

(72) Inventor: Kyu Ho Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/311,892

(22) Filed: May 4, 2023

(65) Prior Publication Data
US 2023/0273748 A1    Aug. 31, 2023

Related U.S. Application Data

(63) Continuation of application No. 17/348,444, filed on Jun. 15, 2021, now Pat. No. 11,681,462.

(30) Foreign Application Priority Data

Jan. 18, 2021  (KR) .................. 10-2021-0006838

(51) Int. Cl.
G06F 12/00    (2006.01)
G06F 3/06    (2006.01)

(52) U.S. Cl.
CPC .......... *G06F 3/0656* (2013.01); *G06F 3/0619* (2013.01); *G06F 3/0652* (2013.01); *G06F 3/0659* (2013.01); *G06F 3/0679* (2013.01)

(58) Field of Classification Search
CPC .... G06F 3/0656; G06F 3/0619; G06F 3/0652; G06F 3/0659; G06F 3/0679
USPC ........................................... 711/154
See application file for complete search history.

(56) References Cited

U.S. PATENT DOCUMENTS

2018/0373428 A1* 12/2018 Kan ............... G06F 3/0616
2020/0356273 A1* 11/2020 Hong .............. G06F 12/0804

* cited by examiner

*Primary Examiner* — Mardochee Chery
(74) *Attorney, Agent, or Firm* — IP & T GROUP LLP

(57) ABSTRACT

A memory system may include a storage medium including a buffer region and a main region; and a controller configured to, when performing a flush operation, move normal data from the buffer region to the main region and maintain pinned data in the buffer region, wherein the pinned data is data which is determined by a host device to be maintained in the buffer region irrespective of the flush operation.

18 Claims, 11 Drawing Sheets

MEMORY SYSTEM PERFORMING FLUSH OPERATION FOR BUFFER REGION

CROSS-REFERENCES TO RELATED APPLICATION

This application is a continuation of U.S. patent application Ser. No. 17/348,444 filed on Jun. 15, 2021, which claims priority under 35 U.S.C. § 119(a) to Korean Patent Application Number 10-2021-0006838, filed on Jan. 18, 2021, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store data, provided from a host device, in response to a write request of the host device. Also, the memory system may be configured to provide stored data to the host device in response to a read request of the host device. The host device is an electronic device capable of processing data and may include a computer, a digital camera, a mobile phone or the like. The memory system may operate by being built in the host device, or may operate by being manufactured in a separable form and being coupled to the host device.

SUMMARY

Various embodiments of the present disclosure are directed to a memory system, an operating method thereof and a computing system which ensure a fast read speed.

In an embodiment of the present disclosure, a memory system may include: a storage medium including a buffer region and a main region; and a controller configured to, when performing a flush operation, move normal data from the buffer region to the main region and maintain pinned data in the buffer region, wherein the pinned data is data which is determined by a host device to be maintained in the buffer region irrespective of the flush operation.

In an embodiment of the present disclosure, a method for operating a memory system may include: indicating data designated by a host device, as pinned data; and moving normal data from a buffer region to a main region and maintaining the pinned data in the buffer region, when a flush operation is performed.

In an embodiment of the present disclosure, a computing system may include: a memory system including a storage medium having a buffer region and a main region, and a controller; and a host device configured to designate as pinned data, data to be maintained in the buffer region irrespective of a flush operation, among data to be stored in the storage medium, wherein, when performing the flush operation, the controller moves normal data except the pinned data among data stored in the buffer region, to the main region.

In an embodiment of the present disclosure, a memory system may include: a storage medium including a buffer region and a main region, the buffer region having a faster access speed than that of the main region; and a controller configured to: write normal data and pinned data in the buffer region, the pinned data being designated as data to be frequently accessed data; determine whether data of the buffer region is the normal data or the pinned data, when performing a flush operation; move the normal data from the buffer region to the main region; and maintain the pinned data in the buffer region.

The memory system, the operating method thereof and the computing system according to the embodiments of the disclosure may ensure a fast read speed.

DETAILED DESCRIPTION

Figure 1:
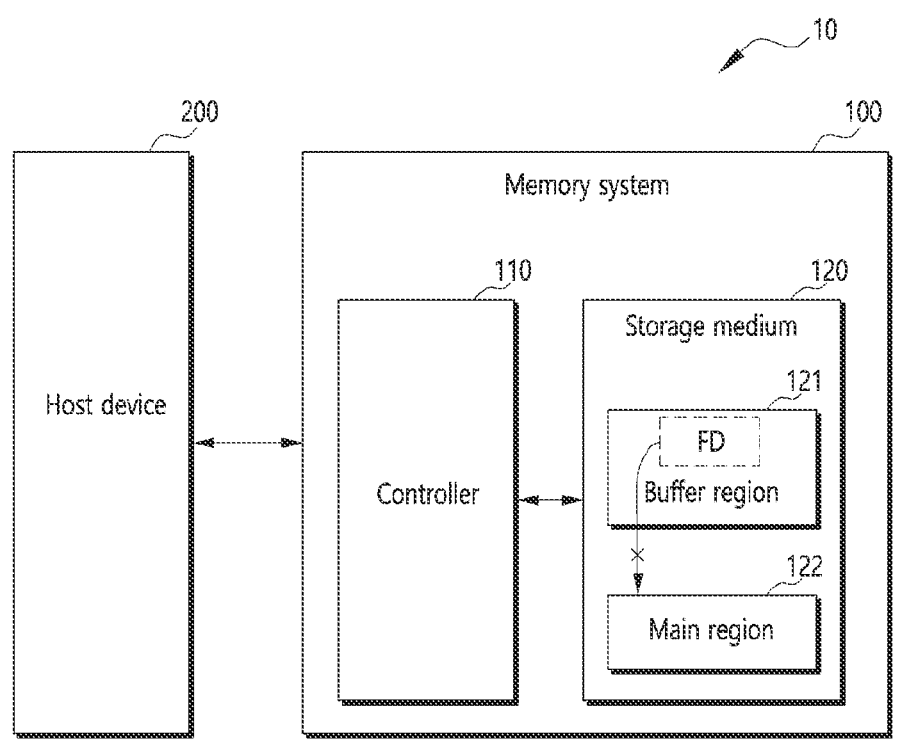
FIG. 1 is a block diagram illustrating a computing system including a memory system in accordance with an embodiment of the present disclosure.

In the present disclosure, advantages, features and methods for achieving them will become more apparent after a reading of the following embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the meaning thereof or the scope of the present disclosure defined in the claims.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a memory system, an operating method thereof and a computing system will be described in detail below with reference to the accompanying drawings through various examples of embodiments.

FIG. 1 is a block diagram illustrating a computing system 10 including a memory system 100 in accordance with an embodiment of the present disclosure.

The computing system 10 may include the memory system 100 and a host device 200. The host device 200 may control the memory system 100. The host device 200 may store data in the memory system 100 through a write command.

The computing system 10 may perform a provisioning operation. For example, the computing system 10 may perform the provisioning operation upon initial booting. For example, through the provisioning operation, the host device 200 may divide a storage space of the memory system 100 into a plurality of regions and may set the uses of the respective regions. For example, through the provisioning operation, the host device 200 may set a main region 122 of the memory system 100 as a region in which user data is to be stored. Also, when the memory system 100 includes the main region 122 and a buffer region 121 corresponding to the main region 122, the host device 200 may set a type of the buffer region 121 through the provisioning operation. The type of the buffer region 121 may mean whether the buffer region 121 is to be dedicated to the main region 122 (i.e., a dedicated type) or be shared with another main region 122 (not illustrated) (i.e., a shared type).

Through the provisioning operation, the host device 200 may further set whether the buffer region 121 is to support a pinned function. As will be described later, when the buffer region 121 supports the pinned function, even if a flush operation for moving data from the buffer region 121 to the main region 122 is performed, the buffer region 121 may maintain data (hereinafter, pinned data FD) selectively designated by the host device 200, as it is.

For example, the host device 200 may designate data to be frequently accessed, as pinned data FD. Before storing data in the memory system 100, the host device 200 may determine whether to designate the corresponding data as pinned data FD. In order to notify a controller 110 that the corresponding data is pinned data FD, the host device 200 may add a pinned hint to a write command for the data. In this case, by referring to the pinned hint included in the write command, the controller 110 may determine that the corresponding data is pinned data FD, and may control the corresponding data so that the corresponding data is maintained in the buffer region 121 as it is. However, according to an embodiment, the host device 200 may notify the controller 110 that the corresponding data is pinned data FD, in a way different from the way of adding the pinned hint to the write command.

When a file corresponding to the pinned data FD is deleted, the host device 200 may transmit a set command (e.g., an unmap command) for the pinned data FD to the controller 110. As a result, the pinned data FD may be erased without remaining in the buffer region 121 any more, by the unmap command. According to an embodiment, when a file corresponding to the pinned data FD is deleted, the host device 200 may control, through a separate command other than the unmap command, the controller 110 so that the controller 110 deletes the pinned data FD from the buffer region 121.

For example, according to the universal flash storage (UFS) specification, the buffer region 121 may be a write booster buffer. According to the existing UFS specification, a type of the write booster buffer may be set, in a provisioning operation, to a dedicated type or a shared type by being set to "00" or "01." Thus, the host device 200 may set together a type and a pinned function of the buffer region 121 as in the following table, but the embodiment of the present disclosure is not limited thereto.

| Set value | Write booster buffer type | Pinned function |
| --- | --- | --- |
| 00 | Dedicated type | Not supported |
| 01 | Shared type | Not supported |
| 10 | Dedicated type | Supported |
| 11 | Shared type | Supported |

Further, for example, according to the UFS specification, a write command may include a reserved field. Therefore, the host device 200 may add a pinned hint by setting a particular value (e.g., 1) to at least one of [7:5] bits of the reserved field of the write command, but the embodiment of the present disclosure is not limited to thereto.

The memory system 100 may be configured to store data, provided from the host device 200, in response to a write request of the host device 200. Also, the memory system 100 may be configured to provide stored data to the host device 200 in response to a read request of the host device 200.

The memory system 100 may include a Personal Computer Memory Card International Association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive (SSD).

The memory system 100 may include the controller 100 and a storage medium 120.

The controller 110 may control general operations of the memory system 100. The controller 110 may control the storage medium 120 to perform a foreground operation according to an instruction of the host device 200. The foreground operation may include operations of writing data in the storage medium 120 and reading data from the storage medium 120 according instructions, that is, a write request and a read request, of the host device 200.

Further, the controller 110 may control the storage medium 120 to perform a background operation that is internally required, independently of the host device 200. The background operation may include at least one among a wear leveling operation, a garbage collection operation, an erase operation, a read reclaim operation and a refresh operation for the storage medium 120. Like the foreground operation, the background operation may include operations of writing data in the storage medium 120 and reading data from the storage medium 120.

Through the provisioning operation, the controller 110 may use the buffer region 121 corresponding to the main region 122 in the storage medium 120. Moreover, through the provisioning operation, the controller 110 may control the buffer region 121 so that the buffer region 121 supports the pinned function.

In detail, the controller 110 may store data, transmitted through a write command from the host device 200, in the buffer region 121 prior to the main region 122. When the write command includes a pinned hint, the controller 110 may indicate that the data stored in the buffer region 121 is pinned data FD.

When a flush operation is triggered, the controller 110 may move data except pinned data FD among data stored in the buffer region 121, to the main region 122. That is, even if the flush operation is performed, the pinned data FD may be continuously maintained in the buffer region 121.

When receiving a set command (e.g., an unmap command) for the pinned data FD from the host device 200, the controller 110 may change the pinned data FD into invalid data. For example, the controller 110 may change the pinned data FD into invalid data by unmapping a mapping relationship corresponding to the pinned data FD. Thus, the pinned data FD, which has become invalid data, may be erased in, for example, a garbage collection operation, and may no longer remain in the buffer region 121.

The storage medium 120 may store data transmitted from the controller 110 and may read stored data and transmit read data to the controller 110, under the control of the controller 110.

The storage medium 120 may include the buffer region 121 and the main region 122. Although not illustrated, the storage medium 120 may include a plurality of main regions and buffer regions corresponding to the respective main regions.

The buffer region 121 may be accessed at a faster operation speed (i.e., write speed and/or read speed) than the main region 122. That is, the buffer region 121 may have a faster operation speed than that of the main region 122. The buffer region 121 may have a smaller memory density than the main region 122. In other words, the number of bits capable of being stored in each memory cell in the buffer region 121 may be less than that in the main region 122. For example, the buffer region 121 may be a single-level cell (SLC) region, and the main region 122 may be a multi-level cell (MLC), a triple-level cell (TLC) or a quad-level cell (QLC) region.

Each of the buffer region 121 and the main region 122 may include a plurality of memory regions. Each memory region may be a unit by which the storage medium 120 performs an erase operation. Namely, when the erase operation is performed for a memory region, all data stored in the memory region may be erased at once.

The storage medium 120 may include at least one nonvolatile memory device. By way of example and without any limitation, the nonvolatile memory device may include a flash memory device such as a NAND flash or a NOR flash, a FeRAM (ferroelectric random access memory), a PCRAM (phase-change random access memory), a MRAM (magnetic random access memory) or a ReRAM (resistive random access memory).

Figure 2A:
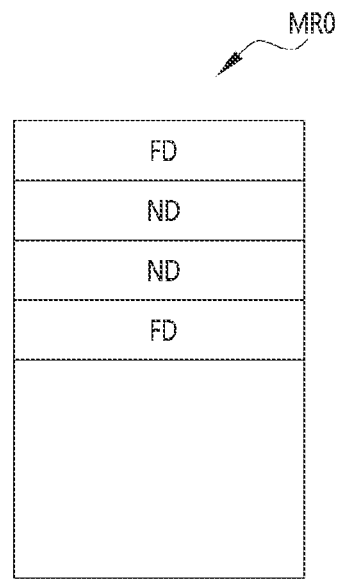
FIGS. 2A and 2B are diagrams illustrating methods for storing data in a buffer region in accordance with embodiments of the present disclosure.
Figure 2B:
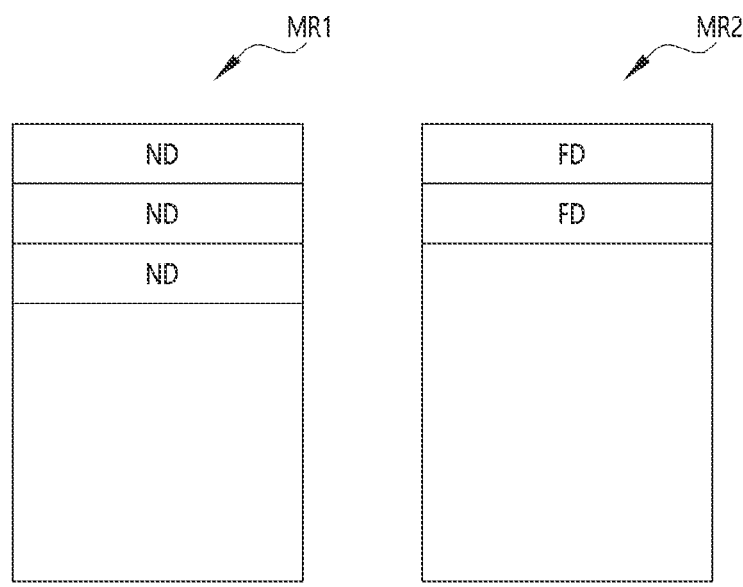

FIGS. 2A and 2B are diagrams illustrating methods for storing data in the buffer region 121 in accordance with embodiments of the present disclosure.

Referring to FIG. 2A, according to an embodiment, a memory region MR0 among memory regions included in the buffer region 121 may store both pinned data FD and data (hereinafter, normal data ND) other than the pinned data FD. That is, the controller 110 may store the pinned data FD and the normal data ND in the same memory region MR0 in the buffer region 121 without distinguishing between the pinned data FD and the normal data ND.

Referring to FIG. 2B, according to an embodiment, a memory region MR1 among memory regions included in the buffer region 121 may store normal data ND, and a memory region MR2 among the memory regions included in the buffer region 121 may store pinned data FD. In other words, according to whether data transmitted through a write command from the host device 200 is pinned data FD or normal data ND, the controller 110 may determine a location to store the data in the buffer region 121. For example, when the write command does not include a pinned hint, the controller 110 may determine the corresponding data as normal data ND and store the corresponding data in the memory region MR1. On the other hand, when the write command includes a pinned hint, the controller 110 may determine the corresponding data as pinned data FD and store the corresponding data in the memory region MR2.

Figure 3A:
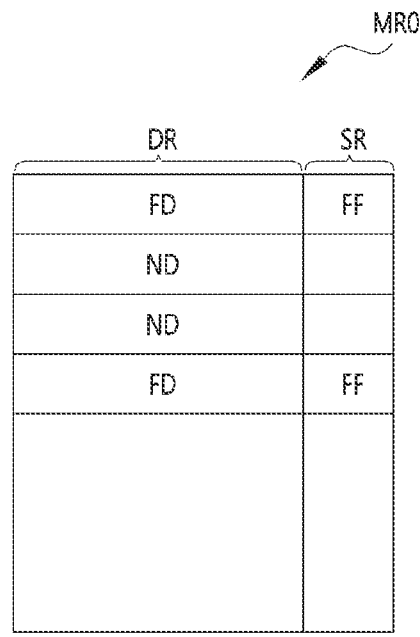
FIGS. 3A and 3B are diagrams illustrating methods for a controller to indicate pinned data in accordance with embodiments of the present disclosure.
Figure 3B:
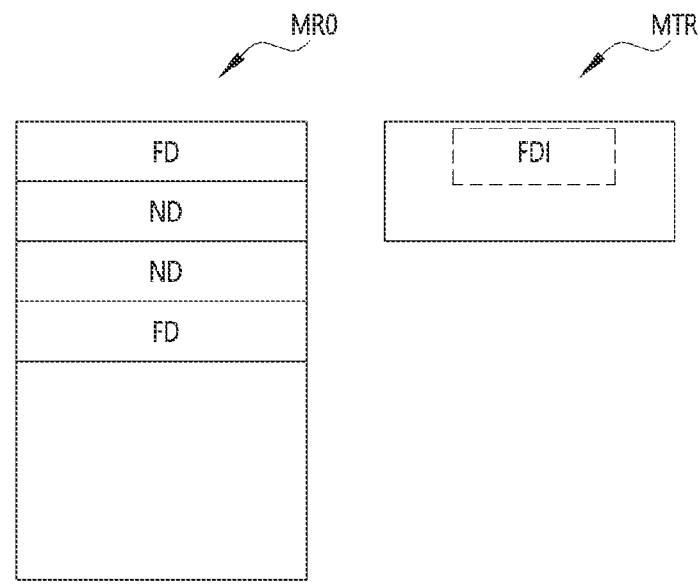

FIGS. 3A and 3B are diagrams illustrating methods for the controller 110 to indicate pinned data FD in accordance with embodiments of the present disclosure.

Referring to FIG. 3A, according to an embodiment, a memory region MR0 of the buffer region 121 may include a data region DR and a spare region SR. When storing pinned data FD in the data region DR, the controller 110 may store a pinned flag FF in the spare region SR. The pinned flag FF may indicate that corresponding data is pinned data FD.

Referring to FIG. 3B, according to an embodiment, the controller 110 may store pinned data information FDI in a meta region MTR which is separated from a memory region MR0 of the buffer region 121. The pinned data information FDI may indicate, for example, which data among data stored in the buffer region 121 is pinned data FD. The pinned data information FDI may point out, for example, a location where pinned data FD is stored in the buffer region 121. The meta region MTR may be located in the storage medium 120 and/or the controller 110.

By way of example, FIG. 3B illustrates a case where pinned data FD and normal data ND are stored in the same memory region as illustrated in FIG. 2A. However, even in the case illustrated in FIG. 2B, the pinned data information FDI may be generated to indicate, for example, a second memory region.

Figure 4:
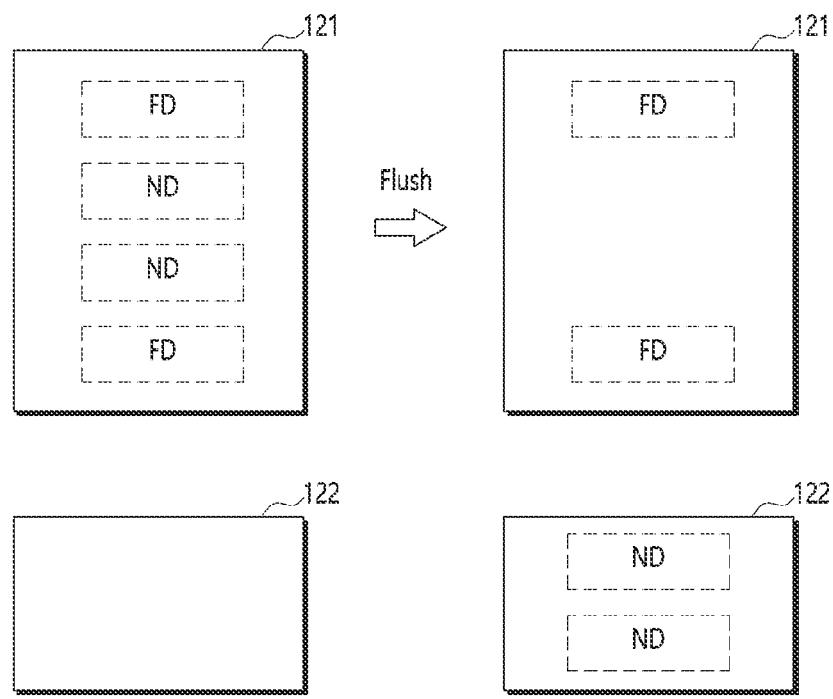
FIG. 4 is a diagram illustrating a method for the controller to perform a flush operation in accordance with an embodiment of the present disclosure.

FIG. 4 is a diagram illustrating a method for the controller 110 to perform a flush operation in accordance with an embodiment of the present disclosure.

Referring to FIG. 4, first, the flush operation may be initiated by a predetermined condition, i.e., when a set condition satisfies. For example, the flush operation may be performed when the memory system 100 is in an idle state. For another example, the flush operation may be performed by an instruction of the host device 200.

Through the flush operation for the buffer region 121, the controller 110 may move normal data ND except pinned data FD among data stored in the buffer region 121, to the main region 122. Namely, even if the flush operation is performed, the pinned data FD may be maintained in the buffer region 121 as it is.

For example, when performing the flush operation, by checking the pinned flag FF stored together with the pinned data FD in the buffer region 121 or checking the pinned data information FDI stored in the meta region MTR, the controller 110 may identify the pinned data FD and may leave the identified pinned data FD in the buffer region 121.

Therefore, according to embodiments of the present disclosure, the pinned data FD may continuously remain in the buffer region 121 until the pinned data FD is erased, and may be quickly read from the buffer region 121 and transmitted to the host device 200 when the pinned data FD is read-requested by the host device 200. That is, the memory system 100 may ensure a fast read speed for the pinned data FD. Accordingly, the host device 200 may designate data to be frequently accessed, as pinned data FD, store the pinned data FD in the memory system 100, quickly receive the pinned data FD from the memory system 100, and process the pinned data FD.

Figure 5:
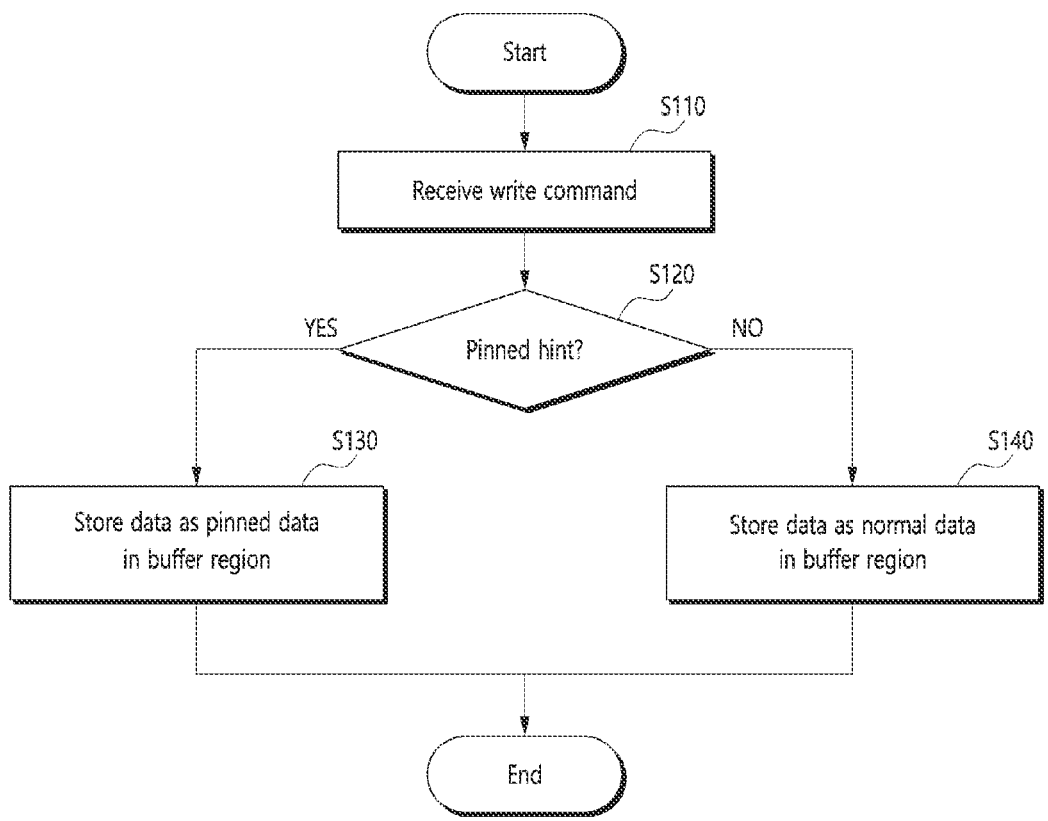
FIG. 5 is a flowchart illustrating a method for the controller to process a write command in accordance with an embodiment of the present disclosure.

FIG. 5 is a flowchart illustrating a method for the controller 110 to process a write command in accordance with an embodiment of the present disclosure.

Referring to FIG. 5, at operation S110, the controller 110 may receive a write command transmitted from the host device 200.

At operation S120, the controller 110 may determine whether the write command includes a pinned hint. When it is determined that the write command includes a pinned hint (S120, YES), the process may proceed to operation S130. When it is determined that the write command does not include a pinned hint (S120, NO), the process may proceed to operation S140.

At the operation S130, the controller 110 may store data, corresponding to the write command, as pinned data FD in the buffer region 121.

At the operation S140, the controller 110 may store data, corresponding to the write command, as normal data in the buffer region 121.

Figure 6:
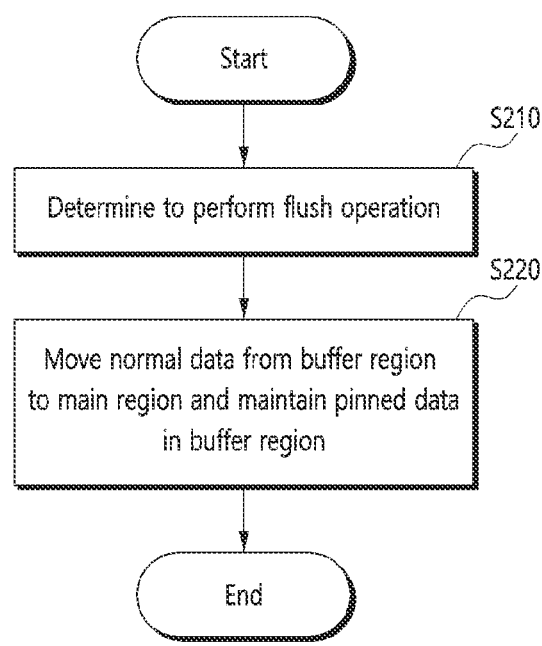
FIG. 6 is a flowchart illustrating a method for the controller to perform a flush operation in accordance with an embodiment of the present disclosure.

FIG. 6 is a flowchart illustrating a method for the controller 110 to perform a flush operation in accordance with an embodiment of the present disclosure.

Referring to FIG. 6, at operation S210, the controller 110 may determine to perform the flush operation.

At operation S220, the controller 110 may move normal data from the buffer region 121 to the main region 122, and may maintain pinned data FD in the buffer region 121.

Figure 7:
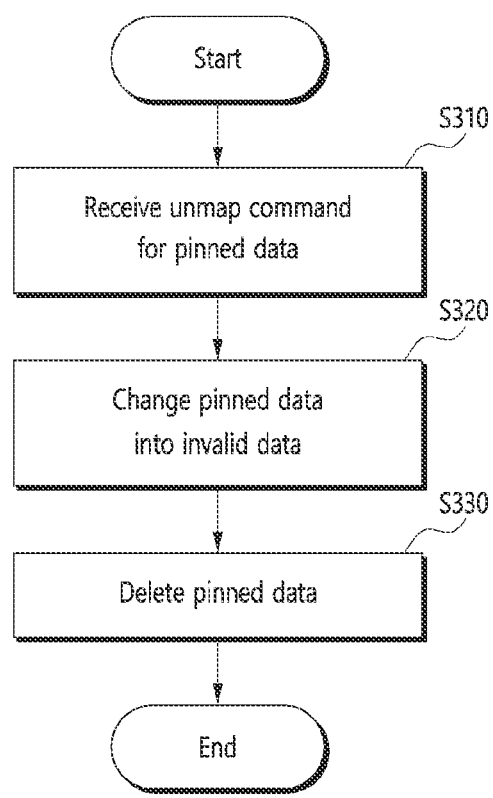
FIG. 7 is a flowchart illustrating a method for the controller to process an unmap command in accordance with an embodiment of the present disclosure.

FIG. 7 is a flowchart illustrating a method for the controller 110 to process a set command (e.g., an unmap command) in accordance with an embodiment of the present disclosure.

Referring to FIG. 7, at operation S310, the controller 110 may receive the unmap command for pinned data FD.

At operation S320, the controller 110 may change the pinned data FD into invalid data by unmapping a mapping relationship corresponding to the pinned data FD.

At operation S330, the controller 110 may delete the pinned data FD which has become invalid data.

Figure 8:
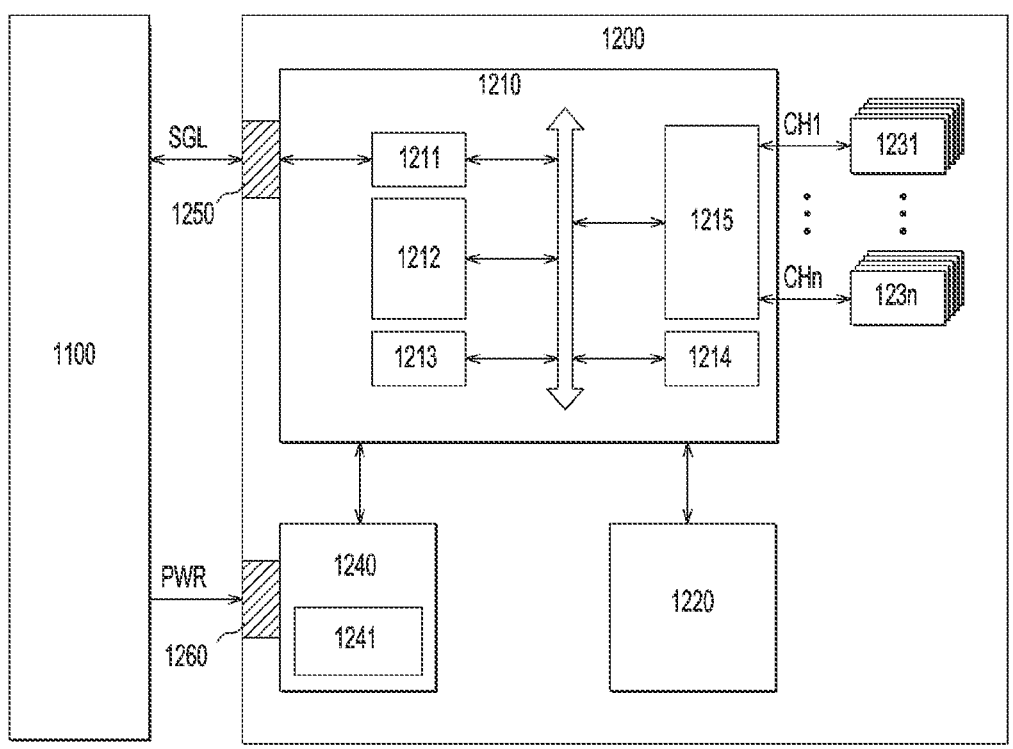
FIG. 8 is a diagram illustrating a data processing system including a solid state drive (SSD) in accordance with an embodiment of the present disclosure.

FIG. 8 is a diagram illustrating a data processing system 1000 including a solid state drive (SSD) 1200 in accordance with an embodiment of the present disclosure. Referring to FIG. 8, the data processing system 1000 may include a host device 1100 and the SSD 1200.

The host device 1100 may correspond to the host device 200 shown in FIG. 1. The host device 1100 may be configured in the same manner as the host device 200.

The SSD 1200 may include a controller 1210, a buffer memory device 1220, a plurality of nonvolatile memory devices 1231 to 123*n*, a power supply 1240, a signal connector 1250, and a power connector 1260.

The controller 1210 may control general operations of the SSD 1200. The controller 1210 may correspond to the controller 110 shown in FIG. 1. The controller 1210 may be configured in the same manner as the controller 110.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any of communication standards or interfaces such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123*n*. The generated parity data may be stored together with the data in the nonvolatile memory devices 1231 to 123*n*. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
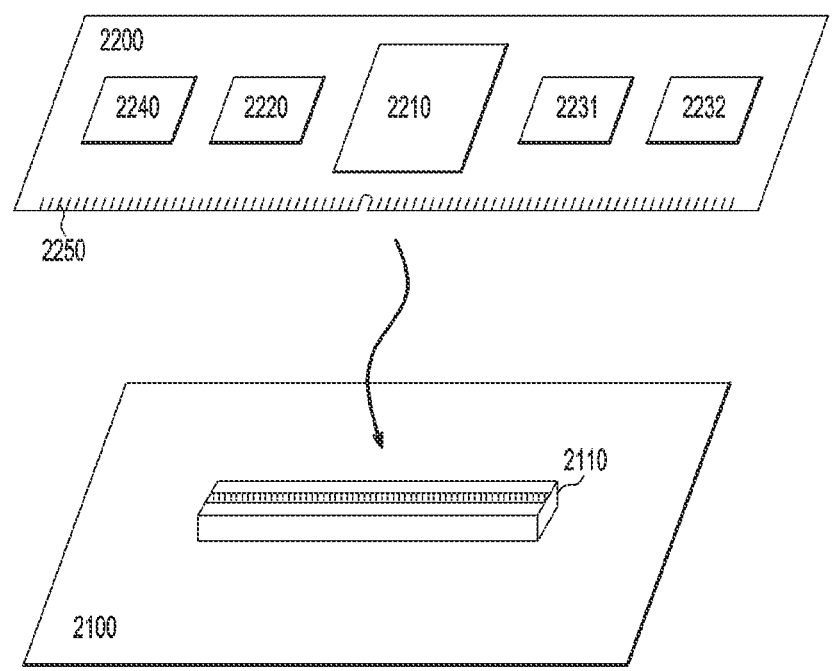
FIG. 9 is a diagram illustrating a data processing system including a memory system in accordance with an embodiment of the present disclosure.

FIG. 9 is a diagram illustrating a data processing system 2000 including a memory system 2200 in accordance with an embodiment of the present disclosure. Referring to FIG. 9, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The host device 2100 may correspond to the host device 200 shown in FIG. 1. The host device 2100 may be configured in the same manner as the host device 200.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 110 shown in FIG. 1 or the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200. The connection terminal 2250 may be disposed on any side of the memory system 2200.

Figure 10:
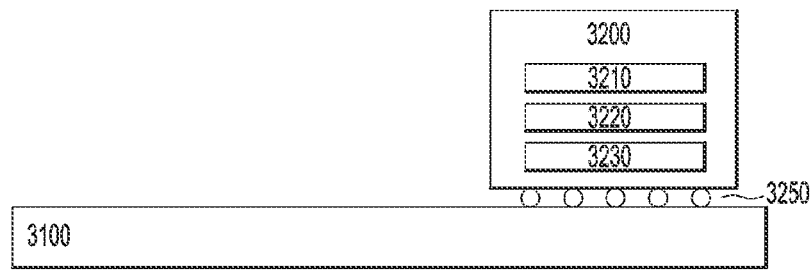
FIG. 10 is a diagram illustrating a data processing system including a memory system in accordance with an embodiment of the present disclosure.

FIG. 10 is a diagram illustrating a data processing system 3000 including a memory system 3200 in accordance with an embodiment of the present disclosure. Referring to FIG. 10, the data processing system 3000 may include a host device 3100 and the memory system 3200.

The host device 3100 may be configured in the form of a board such as a printed circuit board. Although not shown, the host device 3100 may include internal function blocks for performing the function of a host device. The host device 3100 may correspond to the host device 200 shown in FIG. 1. The host device 3100 may be configured in the same manner as the host device 200.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 110 shown in FIG. 1 or the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
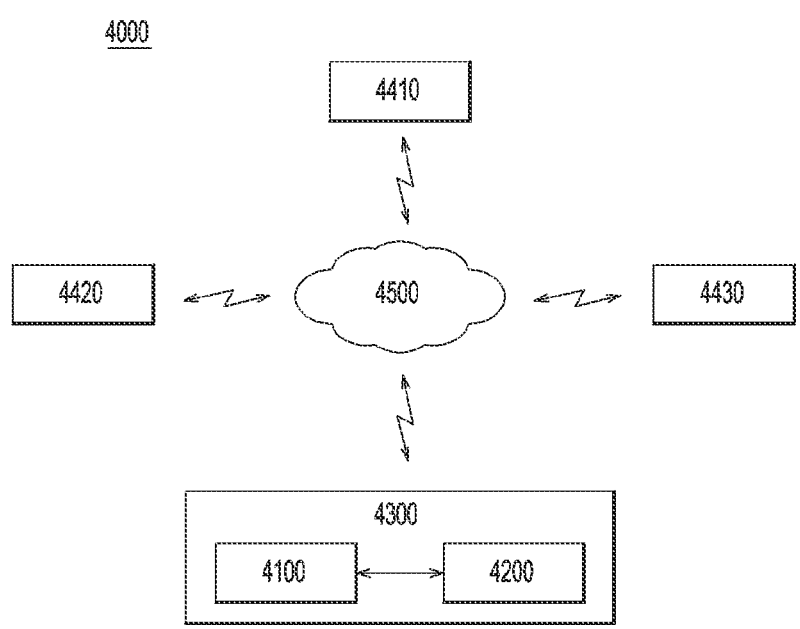
FIG. 11 is a diagram illustrating a network system including a memory system in accordance with an embodiment of the present disclosure.

FIG. 11 is a diagram illustrating a network system 4000 including a memory system 4200 in accordance with an embodiment of the present disclosure. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The host device 4100 may correspond to the host device 200 shown in FIG. 1. The host device 4100 may be configured in the same manner as the host device 200. The memory system 4200 may be configured by the memory system 10 shown in FIG. 1, the SSD 1200 shown in FIG. 8, the memory system 2200 shown in FIG. 9 or the memory system 3200 shown in FIG. 10.

Figure 12:
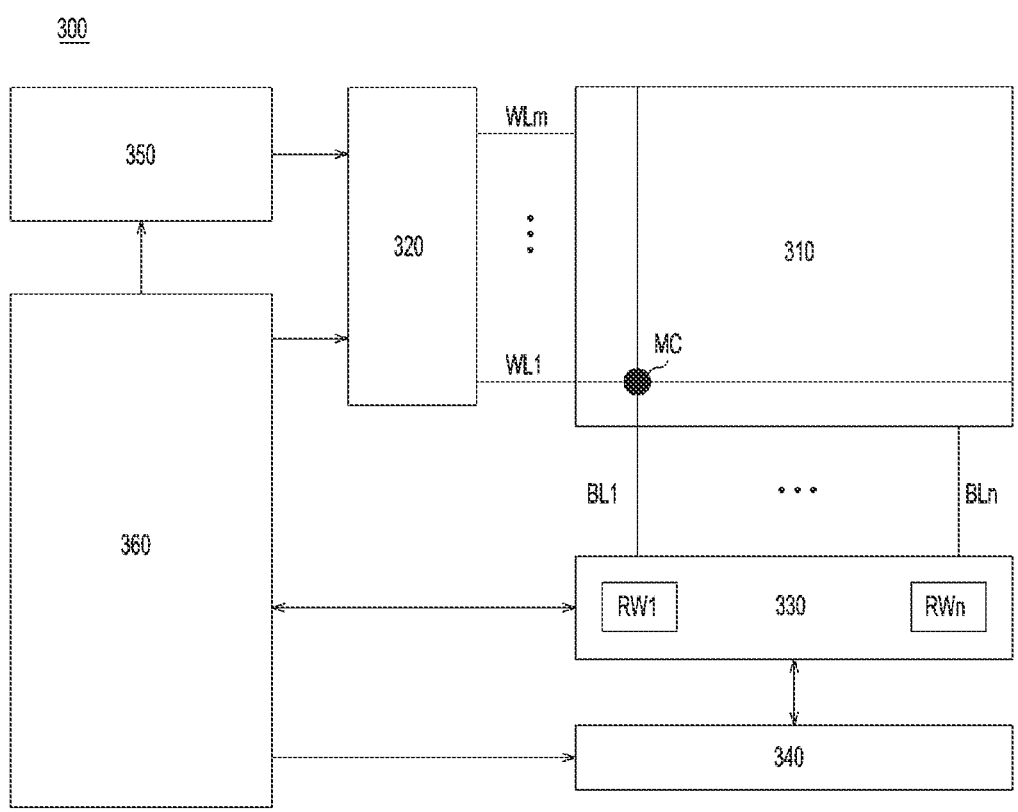
FIG. 12 is a block diagram illustrating a nonvolatile memory device included in a memory system in accordance with an embodiment of the present disclosure.

FIG. 12 is a block diagram illustrating a nonvolatile memory device 300 included in a memory system in accordance with an embodiment of the present disclosure. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from an external device (e.g., a memory controller). The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the memory system, the operating method thereof and the computing system described herein should not be limited based on the described embodiments. Rather, the memory system described herein should only be limited in light of the claims that follow when taken in conjunction with the above description and accompanying drawings.

What is claimed is:

1. A memory system comprising:
a storage medium including a buffer region for a fast speed and plural main regions for a high storage capacity, the buffer region having a type and pinned function set by a host in a provisioning operation, wherein the type indicates whether the buffer region is dedicated to one of the plural main regions or whether the buffer region is shared among the plural main regions; and
a controller configured to determine, based on the type and the pinned function set by the host for the buffer region storing data, whether to move or not the data to at least one of the plural main regions during a flush operation, the flush operation being triggered when a predetermined condition is satisfied, configured to receive a read request including a command and an address from the host, and configured to determine, based on the read request, whether reading data for the read request from the buffer region or from the plural main regions.

2. The memory system according to claim 1, wherein a part of the buffer region is set by the host as a write booster.

3. The memory system according to claim 2, wherein the controller writes data to be frequently accessed by the host in the write booster.

4. The memory system according to claim 3, wherein the controller does not move the data stored in the write booster to the plural main regions during the flush operation.

5. The memory system according to claim 3, wherein the controller reads the data to be frequently accessed by the host from the write booster.

6. The memory system according to claim 1, wherein the flush operation is triggered by an instruction of the host.

7. The memory system according to claim 1, wherein the flush operation is performed when the memory system is in an idle state.

8. A memory system comprising:
a storage medium including a buffer region and a main region, the buffer region including a first buffer and a second buffer, all data stored in the first buffer being moved to the main region during a flush operation and pinned data stored in the second buffer being not moved to the main region during the flush operation, wherein the pinned data remains in the second buffer for access and transmission when requested by a host; and
a controller configured to receive a write request including a command, an address and write data from the host,
wherein the controller determines whether writing the write data in the first buffer or the second buffer in response to the write request based on whether the write data is to be frequently accessed by the host or not.

9. The memory system according to claim 8, wherein whether the buffer region is the first buffer or the second buffer is set by the host in a provisioning operation.

10. The memory system according to claim 8, wherein the write request has an information indicating whether the write data to be frequently accessed by the host or not.

11. The memory system according to claim 8, wherein the flush operation is triggered by an instruction of the host.

12. The memory system according to claim 8, wherein the second buffer is set by the host as a write booster.

13. The memory system according to claim 12, wherein the second buffer is set by the host as the write booster in a provisioning operation.

14. A memory system comprising:
a storage medium including a buffer region and a main region, the buffer region including a first buffer and a second buffer; and
a controller configured to receive a write request including a command, an address and write data from a host, wherein, when the controller writes the write data in the buffer region in response to the write request, the controller determines whether writing the write data in the first buffer or the second buffer based on the write request, and wherein, when the controller performs a flush operation, the controller moves all data in the first buffer to the main region and does not move pinned data in the second buffer to the main region, wherein the pinned data remains in the second buffer for access and transmission when requested by the host.

15. The memory system according to claim 14, wherein the controller receives a read request, and determines whether reading data for the read request from the second buffer based on an information included the read request.

16. The memory system according to claim 14, wherein the flush operation is triggered by an instruction of the host.

17. The memory system according to claim 14, wherein the controller writes data to be frequently accessed by the host in the second buffer.

18. The memory system according to claim 14, wherein the write request has an information indicating whether the write data to be frequently accessed by the host or not.

* * * * *